June 12, 1945. E. M. TUCKER ET AL 2,378,111
POWER SNOW SLED
Filed Oct. 20, 1942 2 Sheets-Sheet 2

INVENTORS
E. M. Tucker,
BY E. M. Tucker Jr. J. M. Tucker
ATTYS

Patented June 12, 1945

2,378,111

UNITED STATES PATENT OFFICE 2,378,111

POWER SNOW SLED

Emmitt M. Tucker, Emmitt M. Tucker, Jr., and Joseph M. Tucker, Burbank, Calif.

Application October 20, 1942, Serial No. 462,688

4 Claims. (Cl. 180—5)

This invention relates to power driven snow sleds; the principal object being to provide a vehicle of this character, particularly adapted for one or two occupants, which will have good traction in almost any kind of snow, which may travel along narrow trails, and which is arranged to remain on a substantially even keel, regardless of the lateral slope of the snow when the latter is relatively soft.

The sled includes a load carrying traction unit and a separate power unit, the units being connected together in vertically articulated relation so that the total weight is distributed over a considerable area. In connection with this arrangement, a further object of the invention is to provide a steering mechanism between the units, operable from the load carrying unit, so arranged that the power unit may be steered irrespective of the angular relationship of the units in a vertical plane, as the sled negotiates undulations in the terrain over which it is traveling.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
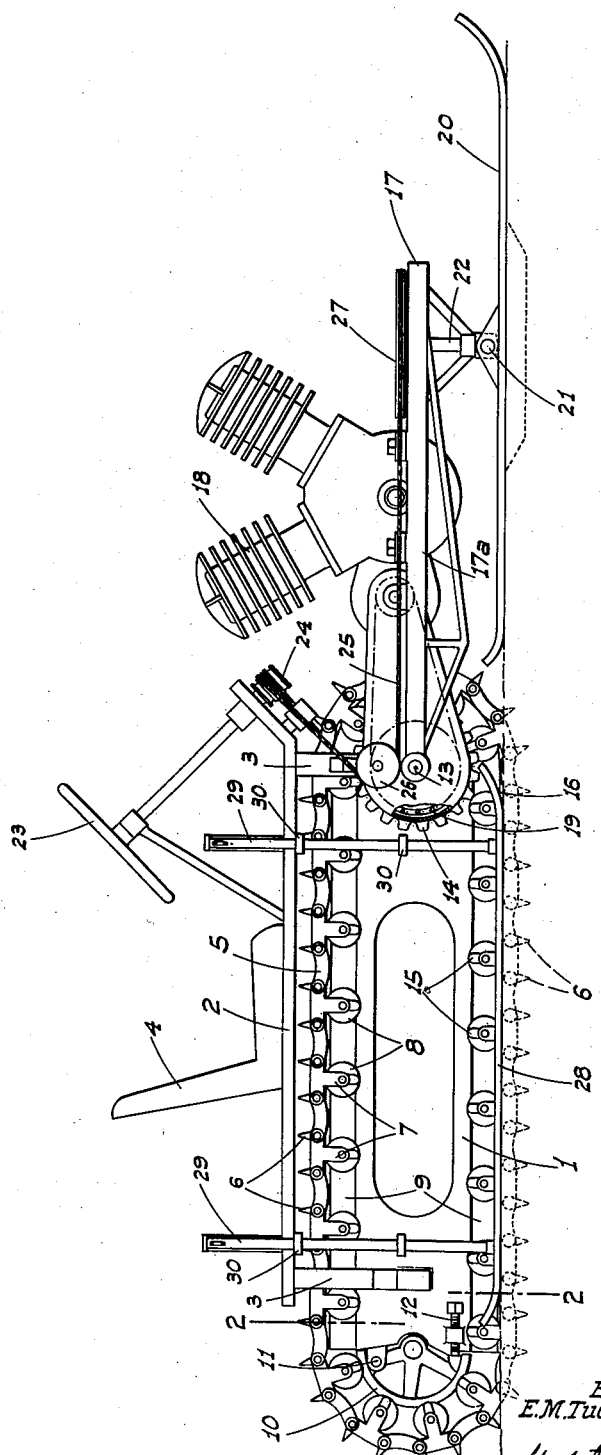
Figure 1 is a side elevation of our improved sled.

Referring now more particularly to the characters of reference on the drawings, the load carrying unit of the sled comprises a relatively long frame 1 of hollow rectangular form in cross section and adapted to carry a fuel tank or other load.

Platform 2 is disposed above and in clearance relation to the frame, being supported therefrom by standards 3 and carrying one or more seats 4.

An endless traction track extends about the frame and comprises side chains 5 disposed laterally out from the side edges of the frame and connected at the ends of the various links of the chain by cross traction members 6. These members are relatively wide radially of the chains and project radially out to present the greatest width at right angles to the snow and thus give good traction. The members 6 are rigid with alternate links of the chains so as not to turn relative thereto.

Alternate links of the chains are formed with central extensions 7 projecting radially inward, and which support flanged rollers 8. These rollers are disposed laterally inward from the extensions and ride in track grooves 9 formed in the sides of the frame 1. Said frame terminates short of the rear end turn of the chains. The grooves 9 are open at said end of the frame, and the rollers passing from or into the grooves are guided by a substantially semi-circular band unit 10 pivoted adjacent the top on the frame as at 11, and provided with adjustment means 12 so that the band may be adjusted to maintain the chains taut.

Figure 2:
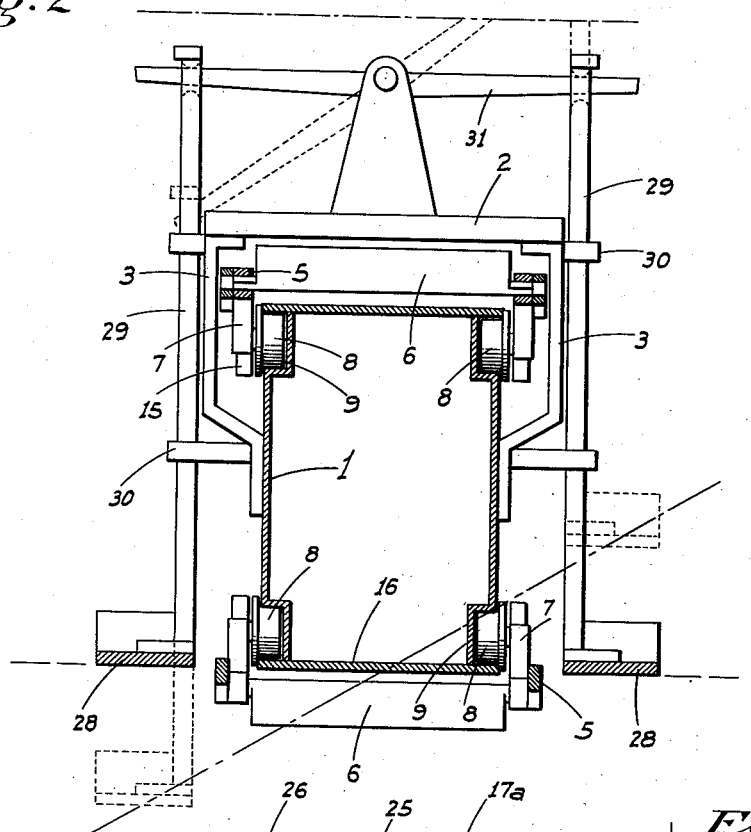
Figure 2 is a transverse section on the line 2—2 of Fig. 1.
Figure 3:
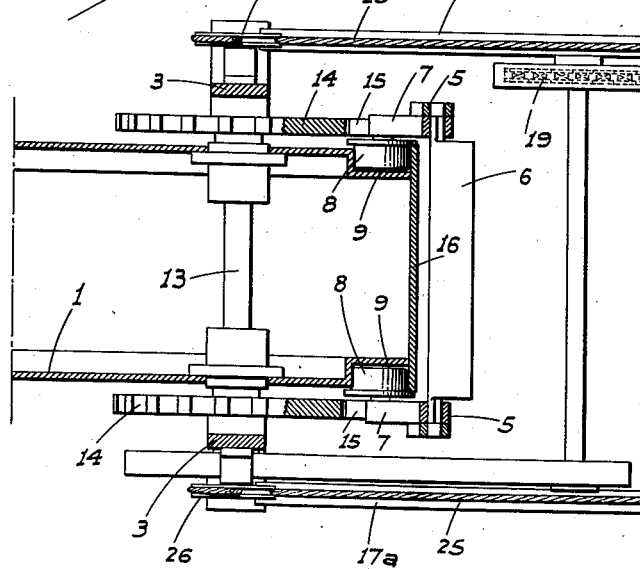
Figure 3 is a fragmentary sectional plan of the sled.

At the forward end of the frame, however, the track grooves 9 are unbroken so as to carry the rollers and maintain the chains in concentric relation with a cross shaft 13 journaled in the frame. Laterally out from said frame, the shaft carries sprocket wheels 14 engaging nubs 15 on the outer ends of the link extensions 7. The frame, particularly along the bottom, is covered by a heavy plate 16 which forms the bottom of the grooves 9 as shown in Fig. 2, and which is spaced a short distance from the cross traction members 6 so as to give the same results in operation as obtained with the structure of our Patent No. 2,284,075.

Disposed ahead of the frame 1 is the power unit of the sled, which includes a frame 17 having side members 17a pivoted on the ends of the shaft 13 for relative swinging movement in a vertical plane. An internal combustion engine 18 of suitable type, such as that used for motorcycles, is mounted on the frame 17 with its crankshaft transverse or parallel to the shaft 13. The engine shaft and the shaft 13 are connected in driving relation by suitable means such as a reduction chain drive, indicated at 19.

The frame 17 is suported adjacent its forward end by a keeled runner 20 which is swivelly connected intermediate its ends as at 21 on an upstanding spindle 22 turnable in the frame 17 ahead of the engine whereby the runner may be steered. At the same time, the pivot mounting 21 of the runner enables the same to tilt in a vertical plane relative to the frame 17. Steering of the runner is effected from the rear unit of the sled by a steering wheel 23 mounted on the forward end of the platform 2 and having a cable drum 24 below said platform.

A cable 25 wound on the drum extends on both sides thereof, about direction changing pulleys 26 mounted on the adjacent standards 3 in a vertical plane close to the shaft 13, and thence forwardly to and about a sheave or wheel 27 on the upper end of the spindle 22; the cable being secured in non-slip relation on said wheel. The sled may therefore be steered irrespective of the relative angularity of the front and rear units in a vertical plane without any material slackening or tensioning of the cable.

Additional snow bearing tread for the rear unit are provided by side runners 28, close to and laterally out from the chains 5 and normally disposed on approximately the same level as the bottom plate 16. The runners are mounted for vertical movement relative to the frame 1 by upstanding standards 29 secured thereon and slidably guided in brackets 30 mounted on the frame. The standards extend some distance above the platform 2 and are connected by an equalizing device 31 so that as one runner moves up, the opposite one moves down. This arrangement enables the sled, which is relatively narrow, to remain on substantially an even keel when traversing a side slope in the snow as indicated in Fig. 2.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A power snow sled including a longitudinal frame, a relatively wide endless driven traction device extending about and directly supported by said frame, the upper run of the device being above the frame; a load supporting platform above the frame and the adjacent portion of the device, and standards rigidly connecting the frame and platform laterally out from the device.

2. A power snow sled including a longitudinal frame of hollow, substantially rectangular form in cross section, an endless driven traction device extending lengthwise about and surrounding the frame, said device including a pair of endless chains spaced apart a distance greater than the width of the frame and cross members connecting the chains; rollers mounted on the chain radially inward from the members and projecting laterally inward, and means guiding the rollers throughout the length of the device and including track grooves for the rollers formed in the sides of the frame.

3. A power snow sled including a longitudinal frame of hollow, substantially rectangular form in cross section, an endless driven traction device extending lengthwise about and surrounding the frame, said device including a pair of endless chains spaced apart a distance greater than the width of the frame and cross members connecting the chains; rollers mounted on the chain radially inward from the members and projecting laterally inward, and means guiding the rollers throughout the length of the device and including track grooves for the rollers formed in the sides of the frame, the frame and grooves terminating at one end short of the adjacent end portion of the device, and a longitudinally adjustable roller engaging unit mounted on and projecting from said one end of the frame in position to engage the rollers on the adjacent portion of the device.

4. A power snow sled comprising a frame, a traction device extending lengthwise of and mounted on the frame, snow engaging runners extending lengthwise of the device on opposite sides thereof, means guiding the runners for vertical movement relative to the frame and a compensating connection between the runners whereby upward movement of one runner will be accompanied by downward movement of the other runner.

EMMITT M. TUCKER.
EMMITT M. TUCKER, Jr.
JOSEPH M. TUCKER.